US010283890B1

United States Patent
Gretz

(10) Patent No.: US 10,283,890 B1
(45) Date of Patent: May 7, 2019

(54) DUPLEX ELECTRICAL CONNECTOR WITH OPEN TRANSITION AREA

(71) Applicant: Arlington Industries, Inc., Scranton, PA (US)

(72) Inventor: Thomas J. Gretz, Delray Beach, FL (US)

(73) Assignee: ARLINGTON INDUSTRIES, INC., Scranton, PA (US)

( * ) Notice: Subject to any disclaimer, the term of this patent is extended or adjusted under 35 U.S.C. 154(b) by 0 days.

(21) Appl. No.: 15/922,426

(22) Filed: Mar. 15, 2018

Related U.S. Application Data

(60) Provisional application No. 62/472,832, filed on Mar. 17, 2017.

(51) Int. Cl.
| | |
|---|---|
| *H01R 13/42* | (2006.01) |
| *H01R 13/426* | (2006.01) |
| *H01R 13/434* | (2006.01) |
| *H01R 13/639* | (2006.01) |
| *H01R 13/631* | (2006.01) |

(52) U.S. Cl.
CPC ......... *H01R 13/426* (2013.01); *H01R 13/434* (2013.01); *H01R 13/631* (2013.01); *H01R 13/639* (2013.01)

(58) Field of Classification Search
CPC .. H01R 13/426; H01R 13/424; H01R 13/631; H01R 13/639
USPC ........................................................ 439/350
See application file for complete search history.

(56) References Cited

U.S. PATENT DOCUMENTS

| | | | |
|---|---|---|---|
| 1,328,290 A | 1/1920 | Overbagh | |
| 2,749,148 A | 4/1953 | Schneiderman | |
| 4,885,429 A | 12/1989 | Schnittker | |
| 6,521,831 B1 * | 2/2003 | Gretz | H01R 13/745 |
| | | | 174/153 R |
| 7,057,107 B2 | 6/2006 | Auray | |
| 7,075,007 B2 | 7/2006 | Auray | |
| 7,151,223 B2 | 12/2006 | Auray | |
| 7,161,095 B1 | 1/2007 | Gretz | |
| 7,226,309 B1 * | 6/2007 | Gretz | H01R 13/5808 |
| | | | 174/660 |
| 7,304,251 B1 * | 12/2007 | Gretz | H01R 13/5812 |
| | | | 174/653 |
| 7,329,144 B1 | 2/2008 | Gretz | |
| 7,358,448 B2 | 4/2008 | Auray | |
| 7,495,184 B1 * | 2/2009 | Gretz | H01R 13/5812 |
| | | | 16/2.1 |

(Continued)

*Primary Examiner* — Alexander Gilman

(57) ABSTRACT

A snap-engagement duplex electrical fitting with an open transition area to accommodate easier insertion of electrical cables and pass-through of conductors. The duplex fitting includes a one-piece connector body having a pair of inlet bores, a single outlet bore and an open transition area. A dividing wall separates the inlet bores. Two cable engaging clips are secured to the connector body, one adjacent each of the inlet bores, for engaging and securing an electrical cable in each of the inlet bores. Two lens-shaped cable passages through the fitting provide a wide path for easy pass-through of conductors through the fitting. A collar stops the forward travel of the inserted cables prior to entering the outlet bore. A funnel surface on the collar enables easy advancement of conductors through the transition by providing a slight redirection of conductors toward the axial center of the outlet bore.

4 Claims, 10 Drawing Sheets

(56) References Cited

U.S. PATENT DOCUMENTS

| | | |
|---|---|---|
| 7,554,041 B2 | 6/2009 | Ducret |
| 7,582,831 B2 | 9/2009 | Kiely |
| 7,882,886 B1 | 2/2011 | Gretz |
| 7,954,538 B1 | 6/2011 | Gretz |
| 8,124,891 B1 * | 2/2012 | Gretz .................... H02G 3/083 164/137 |
| 9,293,900 B1 * | 3/2016 | Gretz ....................... H02G 3/18 |
| 9,553,415 B1 * | 1/2017 | Gretz .................... H02G 3/083 |
| 9,640,964 B1 * | 5/2017 | Gretz ................... H02G 3/0481 |

* cited by examiner

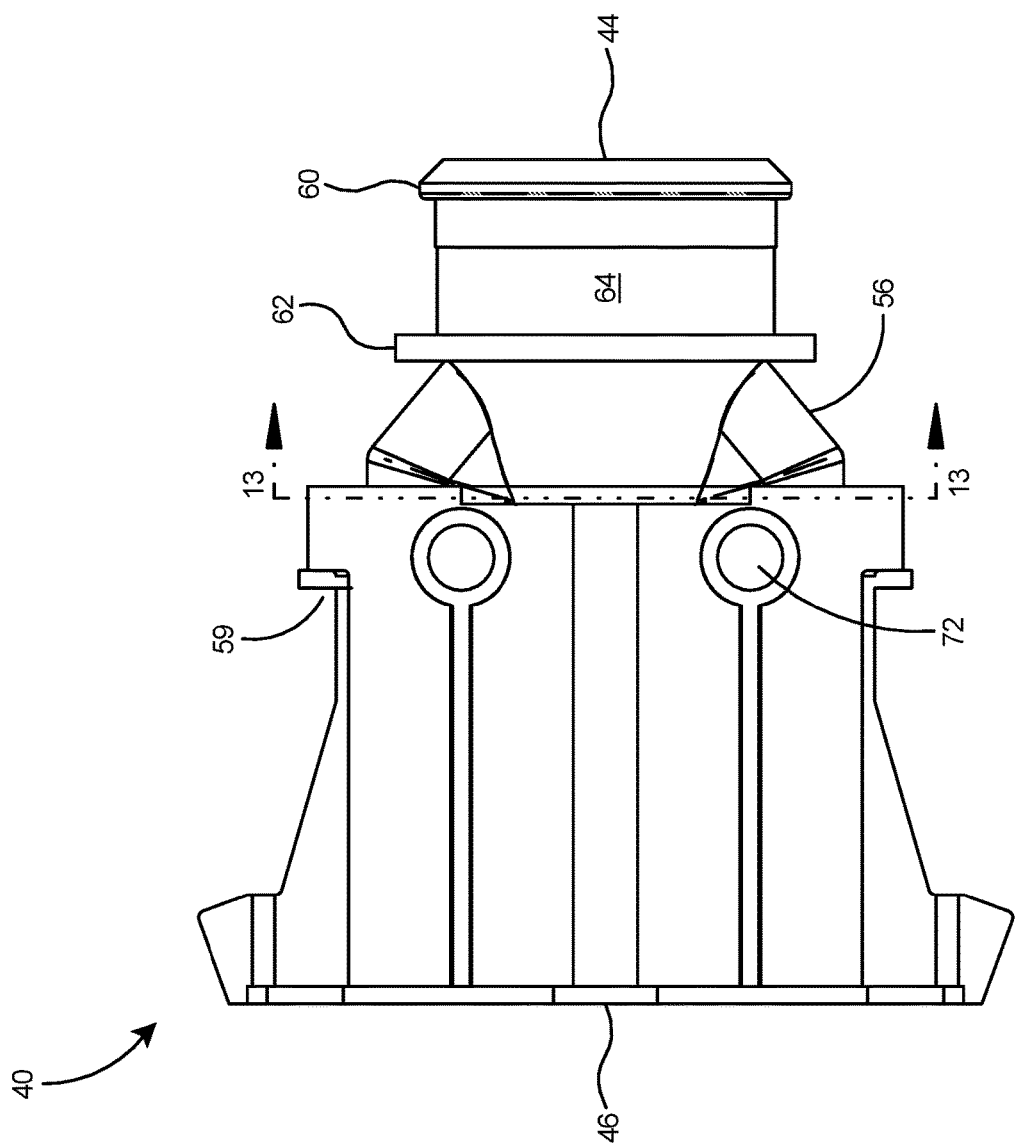

DUPLEX ELECTRICAL CONNECTOR WITH OPEN TRANSITION AREA

CROSS-REFERENCE TO RELATED APPLICATIONS

This application claims the benefit of provisional U.S. application No. 62/472,832, filed Mar. 17, 2017, the contents of which are incorporated herein in their entirety.

FIELD OF THE INVENTION

This invention relates to connectors for connecting electrical cables to a panel and specifically to a duplex electrical fitting with improved internal structure for enabling effortless pass-through of conductors through the internal bores.

BACKGROUND OF THE INVENTION

With reference to FIGS. 1 and 2 there is shown a prior art duplex fitting 20 that is used for quick connection of one or two electrical cables to an electrical box or panel. The prior art duplex fitting 20 includes a leading end 22 and a trailing end 24. The leading end includes an outlet bore 26. A dividing wall 28 divides the trailing end of the duplex fitting into two inlet bores 30. The duplex fitting 20 includes a transition area 32 at the transition of the inlet bores 30 to the outlet bore 26. At the transition area 32, conventional duplex fittings such as shown in FIGS. 1 and 2 typically include a constriction 34 extending from the dividing wall 28 in order to assist in stopping advancement of any electrical cables inserted into the trailing end of the fitting. As shown in FIG. 2, the axial center 36 of outlet bore 26 is axially offset from the axial center 38 of each inlet bore 30.

Electrical cables typically include internal conductors and a sheath surrounding the conductors. For connection to a duplex fitting, an end portion of the sheath must be stripped away to enable the conductors to pass through the fitting and into the electrical box or panel. The forward travel of the sheath is stopped at the transition area 32, but the conductors must pass through. The offset of the outlet bore 26 from the inlet bores makes travel of the conductors through the transition area and through the outlet bore 26 difficult as the conductors must make a substantial change in direction in a very short space. Unfortunately, the dividing wall constriction 34 presents an additional disadvantage to the travel of conductors in that it constricts the transition area 32 at the transition of the inlet bores 30 to the outlet bore 26 making it difficult to advance the conductors through the fitting and tending to cause the cables to jam within the duplex fitting.

Accordingly, what is needed is a duplex fitting that enables easy passage of an electrical cable within the inlet bores and also allows easy passage of conductors through the transition area and through the outlet bore while at the same time stopping the forward travel of the electrical cable.

BRIEF SUMMARY OF THE INVENTION

The invention is a snap-engagement duplex electrical fitting with an open transition area to accommodate easier insertion of electrical cables. The duplex fitting includes a one-piece connector body having a pair of inlet bores, a single outlet bore and an open transition area at the joinder of the bores. A dividing wall having a leading end and a trailing end separates the two inlet bores. Two cable engaging clips are secured to the connector body, one adjacent each of the inlet bores, for engaging and securing an electrical cable in each of the inlet bores. A collar extends into each inlet bore from the connector body. The collar functions as an end stop and stops the forward travel of the inserted cables just before the outlet bore. Two lens-shaped cable passages in the fitting provide a wide path for easy pass-through of conductors through the fitting. A funnel surface on the interior surface of the collar provides slight redirection of conductors toward the axial center of the outlet bore, thereby enabling easy advancement of conductors through the transition area. The leading end of the connector body includes a cylindrical nose portion and a split cylindrical snap ring for providing positive engagement of the leading end of the duplex fitting to an electrical box. The dividing wall at its longitudinal center includes two wall portions that are substantially parallel, with the leading end of the dividing wall being substantially the same thickness at its longitudinal center as at the trailing end of the dividing wall.

OBJECTS AND ADVANTAGES

The duplex electrical fitting of the present invention provides an open transition area, which enables easier insertion of electrical cables into the fitting and pass-through of conductors through the outlet bore.

A collar extending into each inlet bore provides a positive end stop, stopping the forward travel of the inserted cables just before the transition area transitioning from the inbound to the outlet bore.

The sides of the dividing wall at its longitudinal center are linear providing a straight-line path for advancement of electrical cables into the inlet bores.

The leading end of the dividing wall is free of obstructions, increasing the width of the transition area that transitions from two inlet bores to a single outlet bore.

The dividing wall at its longitudinal center is substantially a minimal and constant thickness throughout its length, enabling easier pass-through of the cables and their conductors.

The connector body is constructed in one piece thereby eliminating an extra production step common with two-piece connector bodies and reducing assembly cost.

Two lens-shaped cable passages provide a wide path thereby enabling easy pass-through of conductors through the duplex fitting.

A funnel surface on the interior surface of the collar provides slight redirection of conductors toward the axial center of the outlet bore, thereby enabling easy advancement of conductors through the transition area.

The duplex fitting of the present invention enables rapid connection of one or two cables to an electrical box including snap in engagement of electrical cables on the trailing end and snap in engagement of the leading end to the electrical box.

The connector body, being of one-piece construction of metal, provides good electrical continuity between the sheathing of the connected electrical cables, the connector body, and the electrical box it is connected to.

These and other objects and advantages of the present invention will be better understood by reading the following description along with reference to the drawings.

BRIEF DESCRIPTION OF THE SEVERAL VIEWS OF THE DRAWING(S)

Reference is made herein to the accompanying drawings, which are not necessarily drawn to scale, and wherein:

FIG. 11 is a side view of the connector body which forms a portion of the duplex fitting of FIG. 3.

DETAILED DESCRIPTION

Figure 1:
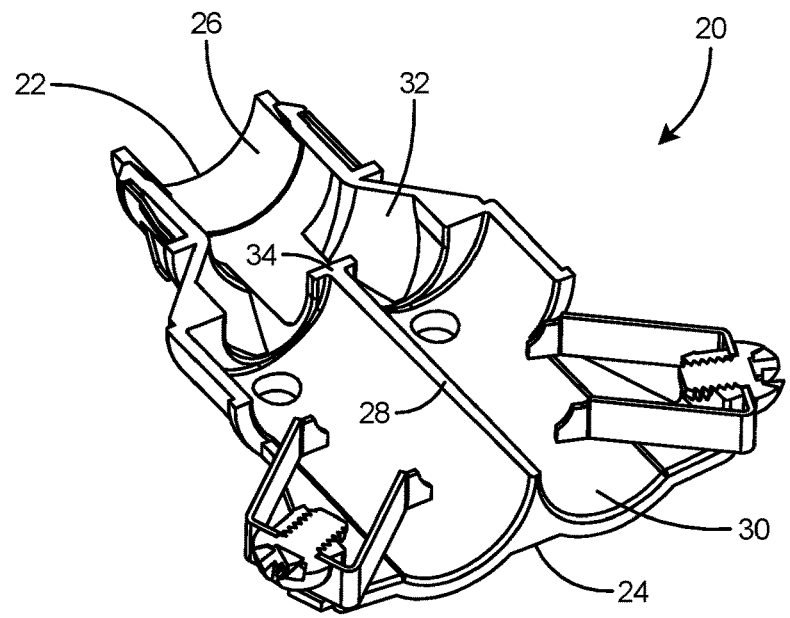
FIG. 1 is an isometric view of the interior of a prior art duplex fitting having a two inlet bores, a dividing wall, an constriction at the leading end of the dividing wall.
Figure 2:
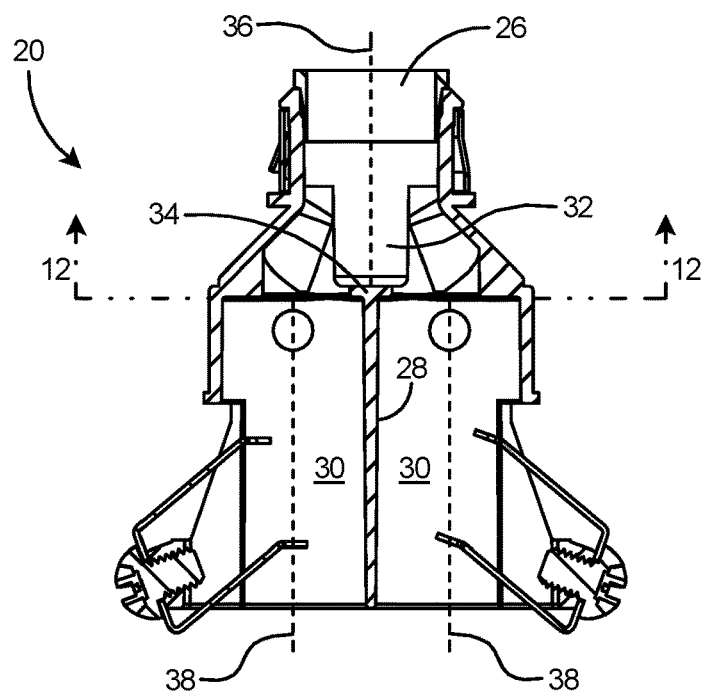
FIG. 2 is sectional view of the prior art duplex fitting FIG. 1 depicting the two inlet bores, the dividing wall, the constriction at the leading end of the dividing wall.
Figure 3:
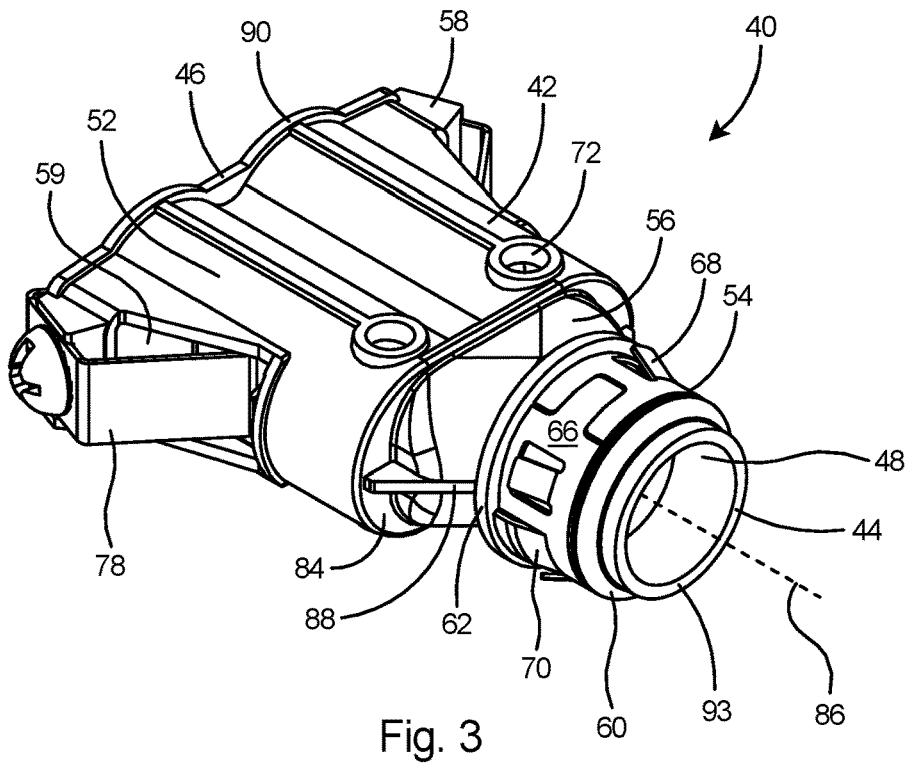
FIG. 3 is an isometric view of the leading end of a duplex fitting according to the present invention.
Figure 4:
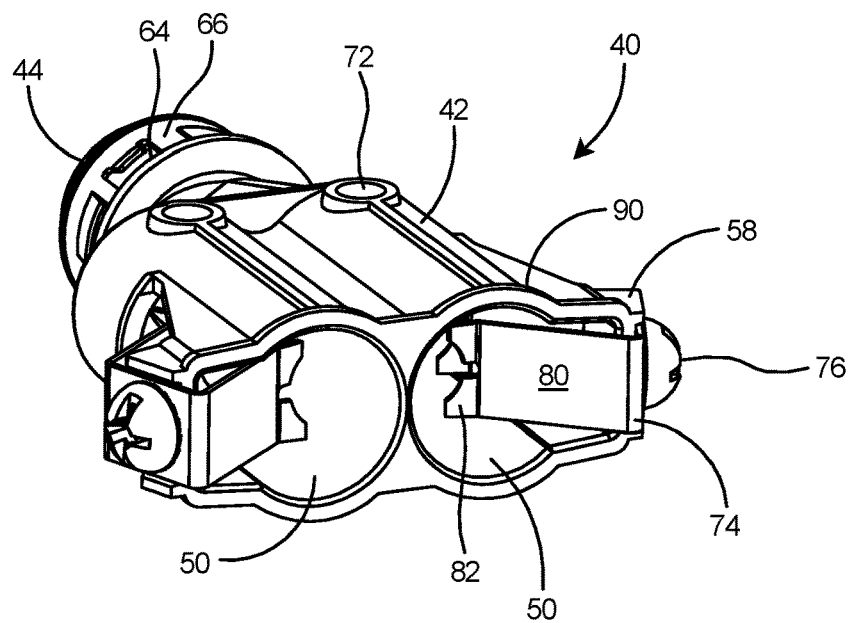
FIG. 4 is an isometric view of the trailing end of the duplex fitting of FIG. 3.
Figure 5:
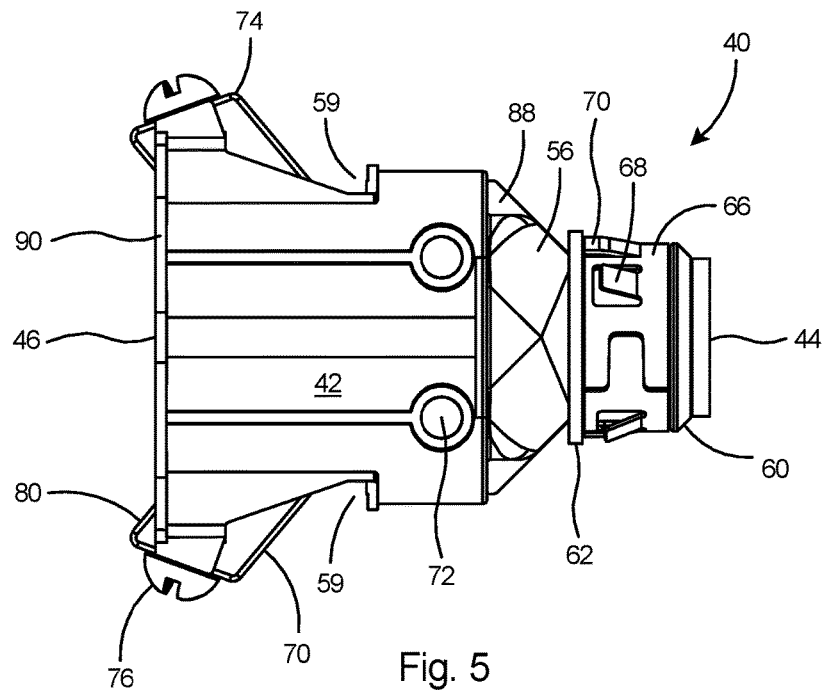
FIG. 5 is a plan view of the duplex fitting of FIG. 3.
Figure 6:
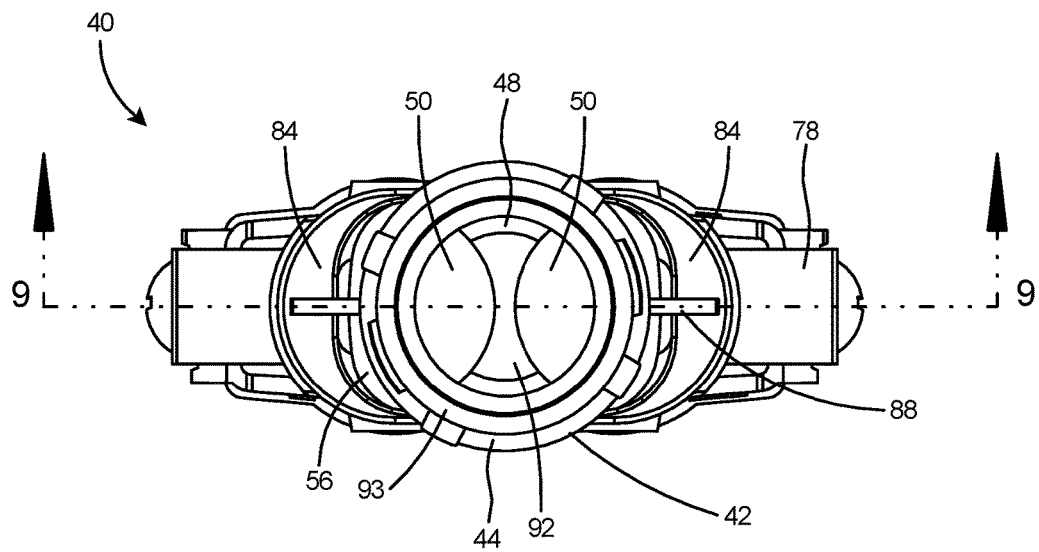
FIG. 6 is an end view of the duplex fitting from the leading end.

With reference to FIGS. 4-6, a duplex fitting 40 according to the present invention includes a connector body 42 having a leading end 44 and a trailing end 46. The meaning of the term "leading end" refers to the end of the connector body that is pressed into the knockout of an electrical box or panel and meaning of the term "trailing end" refers to the end that trails away from the electrical box or panel. Thus the leading end 44 connects to a box to which conductors (not shown) from a cable must be passed for the conduction of electrical current to the electrical component or components within the box and the trailing end 46 is for connection of one or two electrical cables thereto.

Leading end 44 includes an outlet bore 48 and trailing end 46 includes two inlet bores 50. Connector body 42 includes a trailing body portion 52, a leading body portion 54, and a shoulder 56 connecting the two portions. The trailing body portion 52 includes the inlet bores 50, two wings 58 extending from the trailing end 46 of the connector body 42, and channels 59 on opposing sides of the trailing body portion 52. A leading flange 60 and mid-body flange 62 on the leading body portion 54 define a seat 64 thereon. A resilient snap ring 66 is disposed in the seat 64. Snap ring 66 may include locking tangs 68 and grounding tangs 70. Trailing body portion 52 of connector body 42 may include one or more viewports 72 therein. A resilient clip 74 is secured, by fasteners 76 as shown, to each wing 58. The clip 74 includes a leading leg 78 extending through the channel 59 into the inlet bore 50, a trailing leg 80 extending directly into the inlet bore 50, and two feet 82. The shoulder 56 includes a collar 84 that is substantially perpendicular to the axial center 86 of the outlet bore 48 and one or more ribs 88 extending radially outward from the shoulder 56 and substantially parallel to the axial center 86 of outlet bore 48. A trailing flange 90 extends around the periphery of the trailing end 46 of the connector body 42.

Referring to FIG. 6, connector body 42 of duplex fitting 40 includes a dividing wall 92 that provides separation between the two inlet bores 50. Duplex fitting may further include an insulated throat piece 93 inserted into the outlet bore 48 at the leading end 44 of the fitting. Insulated throat piece 93 insulates a substantial portion of the outlet bore to avoid abrading the insulation on the individual conductors to prevent shorting.

Figure 7:
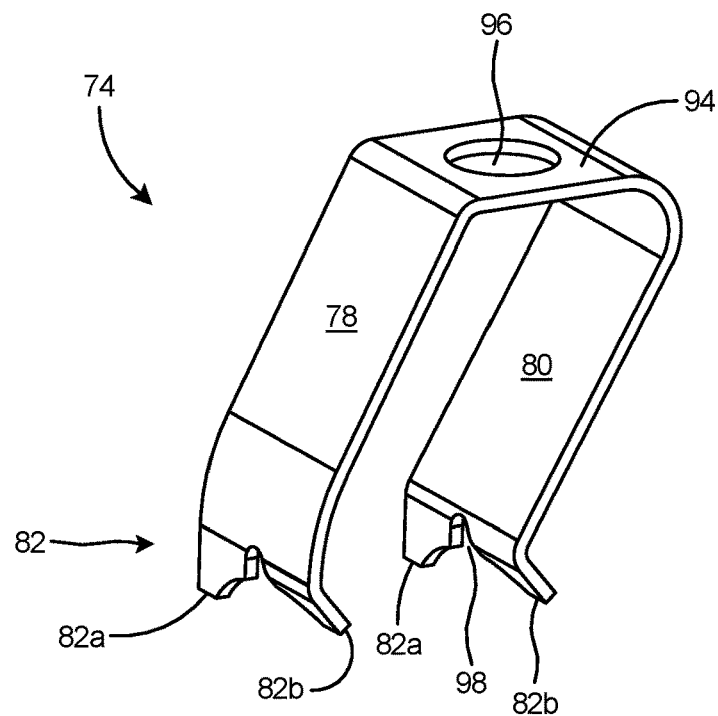
FIG. 7 is an isometric view of a clip member that forms a portion of the duplex fitting of FIG. 3.

As shown in FIG. 7, resilient clip 74 includes a leading leg 78, a trailing leg 80, and two feet 82. The clip includes a base 94 with an aperture 96. The feet extending from the legs 78 and 80 include a first foot 82a and a second foot 82b defined by a notch 98 in the legs. First foot 82a is preferably at a first angle from the plane containing the respective leg and second foot 82b is preferably at a second, sharper angle from the plane containing the respective leg.

Figure 8:
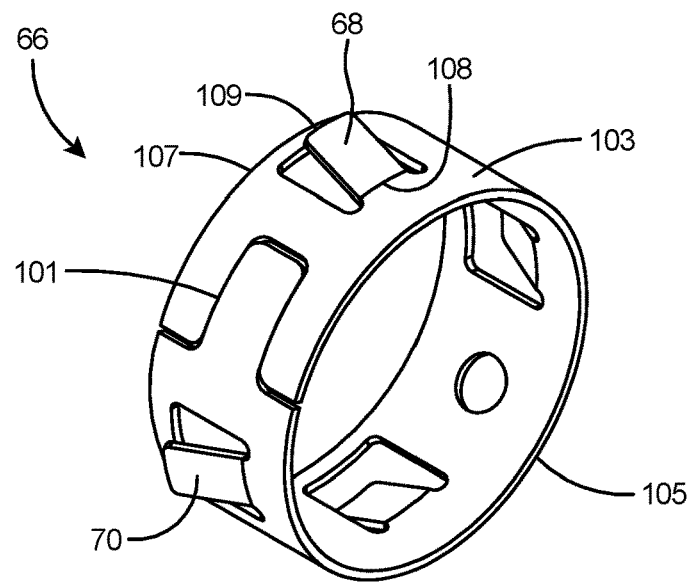
FIG. 8 is an isometric view of a snap ring that forms a portion of the duplex fitting of FIG. 3.

With reference to FIG. 8, resilient snap ring 66 is a split ring with a gap or split 101 in the ring body 103. The snap ring, being constructed of resilient material such as spring steel, may be expanded from its unbiased shape as shown in FIG. 8 to a larger diameter to fit onto the seat 64 (see FIG. 4) of connector body. The snap ring includes a leading end 105 and a trailing end 107. Locking tangs 68 and grounding tangs 70 extend outward of the ring body 103 and include cantilevered ends 108 and free ends 109, with the free ends 109 directed toward the trailing end 107 of the ring.

Figure 9:
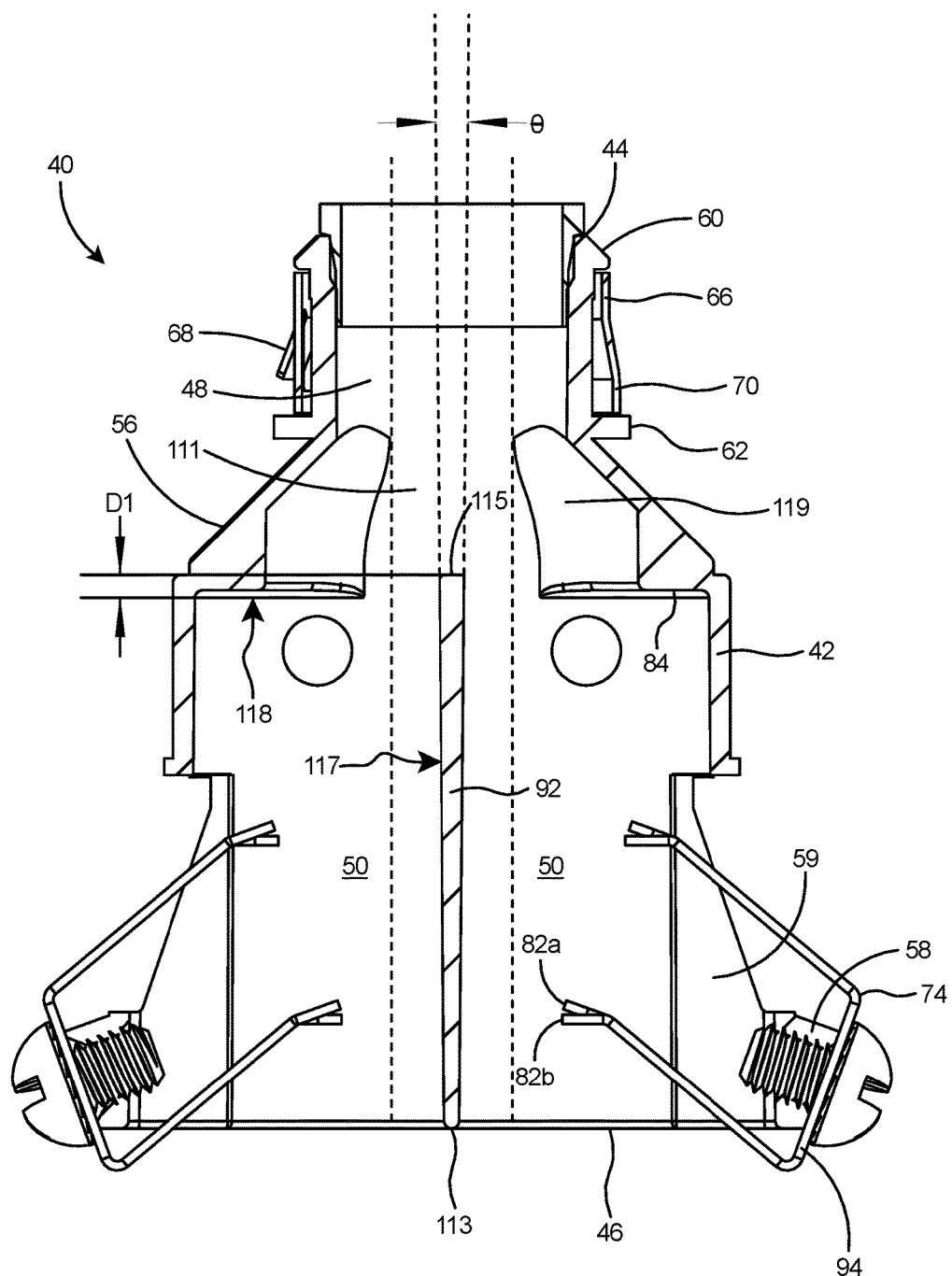
FIG. 9 is a sectional view of the duplex fitting taken along line 9-9 of FIG. 6.

Referring to FIG. 9, the connector body 42 includes an open transition area 111 in the interior of the connector body at the transition of the inlet bores 50 to the outlet bore 48. The open transition area 111 is substantially interior of the shoulder 56. Dividing wall 92 provides separation between the inlet bores 50. Dividing wall 92 includes an inbound end 113 and an outbound 115. A critical feature of the duplex fitting 40 of the present invention is that there is no constriction at the outbound end 115 of the dividing wall. By eliminating the constriction on the dividing wall, an open transition area 111 is achieved, thus the insertion of electrical conductors through the bores of the duplex fitting 40 is substantially easier, requiring less force for insertion of the cable and conductors as compared to prior art duplex fittings with constrictions. The dividing wall 92 at its longitudinal center includes two sides 117 that are substantially parallel (angle θ is approximately 0), with the outbound end 115 of the dividing wall being substantially the same thickness at its longitudinal center as the inbound end 113 of the dividing wall 92. The collar 84 includes a flat abutment surface 118 thereon.

Figure 10:
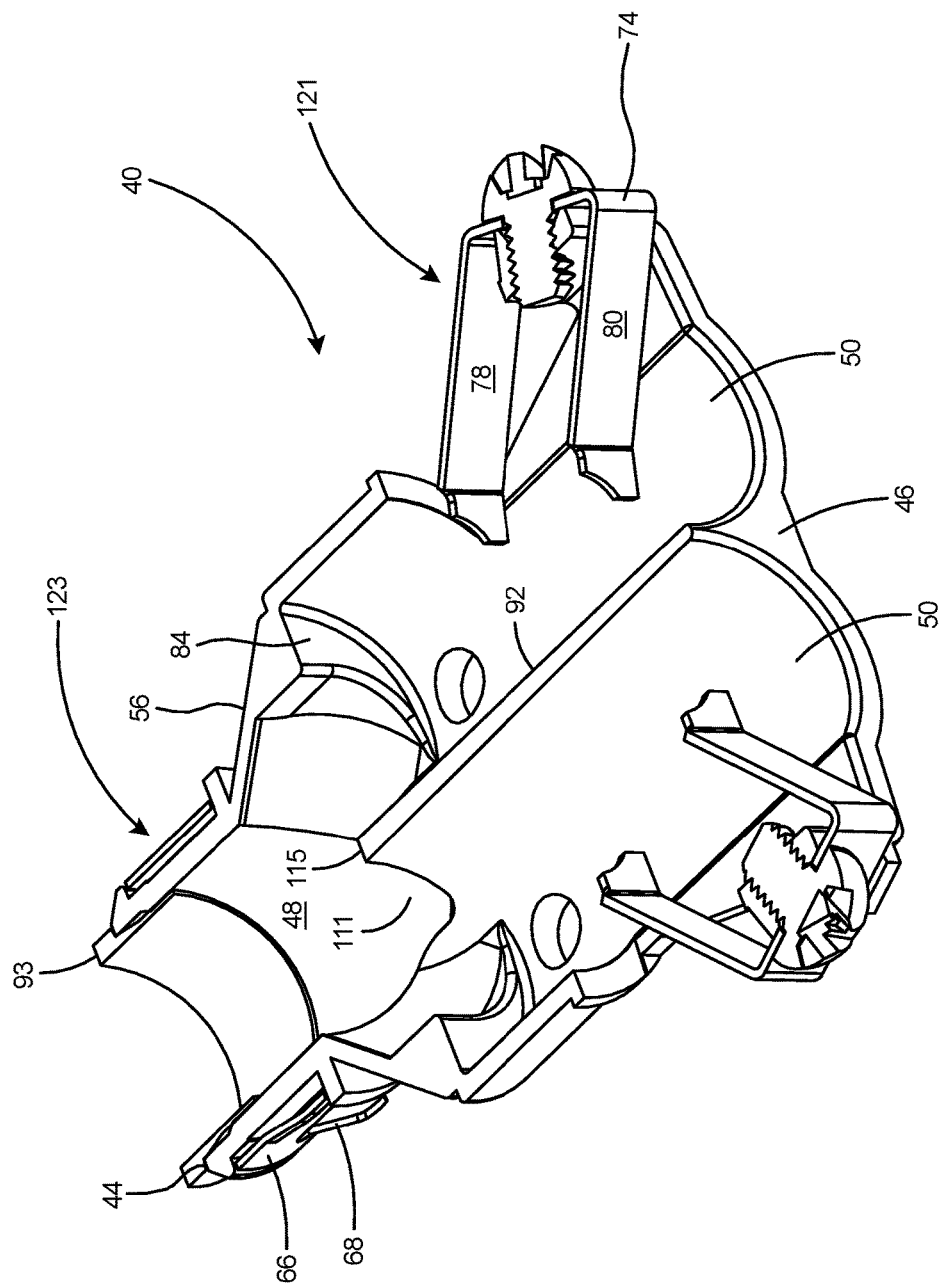
FIG. 10 is an isometric view of the interior of the duplex fitting.

As shown in FIG. 10, the dividing wall 92 includes the outbound end 115 that is free of constrictions or obstructions, which provides an open transition area 111 enabling easy passage of electrical conductors (not shown) there through. A funnel surface or funnel 119 on the collar 84 provides a redirection of conductors toward the axial center of the outlet bore 48 before the conductors pass the transition area 111, thereby enabling easy advancement of conductors through the transition area. The resilient clips 74 secured at the wings 58 form a cable attachment arrangement 121 for securing an electrical cable within each inlet bore 50. Resilient split snap ring 66 locking tangs 68, and grounding tangs 70 form a box attachment arrangement 123 for securing the leading end 44 of the duplex fitting to an electrical box or panel (not shown).

Figure 13:
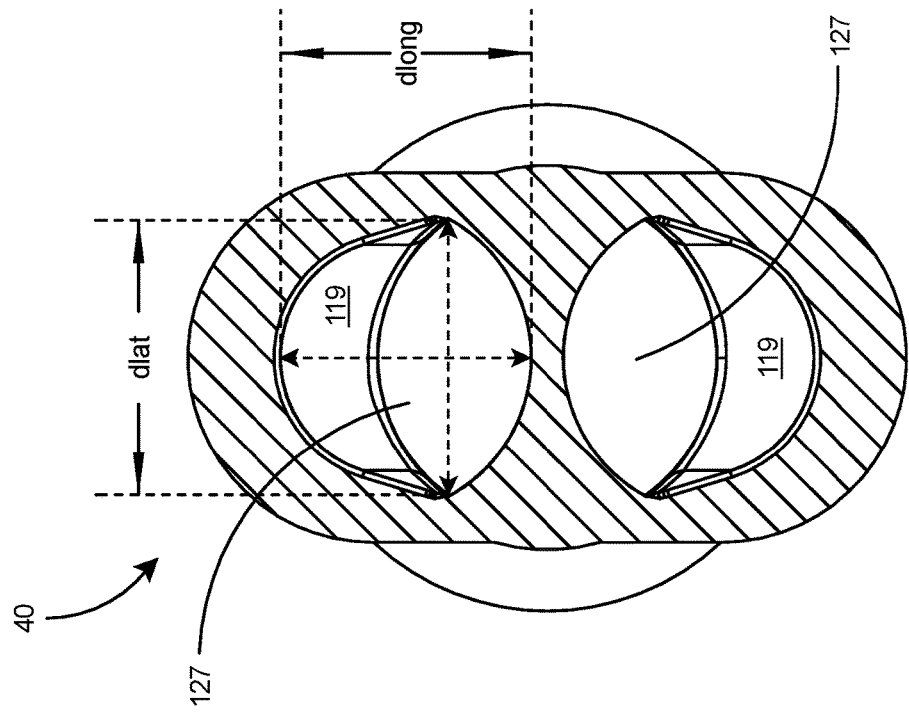
FIG. 13 is a sectional view of the connector body of the present invention taken along line 13-13 of FIG. 11.
Figure 12:
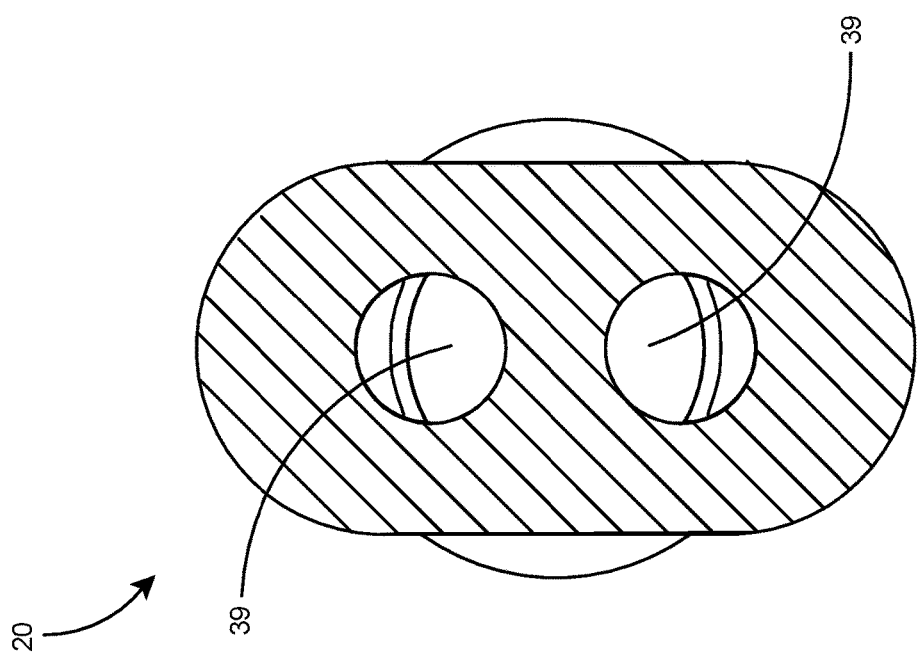
FIG. 12 is a sectional view of the connector body taken along line 12-12 of the prior art duplex fitting in FIG. 2.

As shown in FIG. 12, prior art duplex fitting 20 includes two narrow passageways 39 at the transition area. In comparison, as shown in FIG. 13, the duplex fitting 40 of the present invention includes two lens-shaped cable passages 127 at the transition area. The lens-shaped cable passages 127 provide two substantially straight-line paths 129 (see FIG. 9) for easing pass-through of conductors through the fitting.

Figure 14:
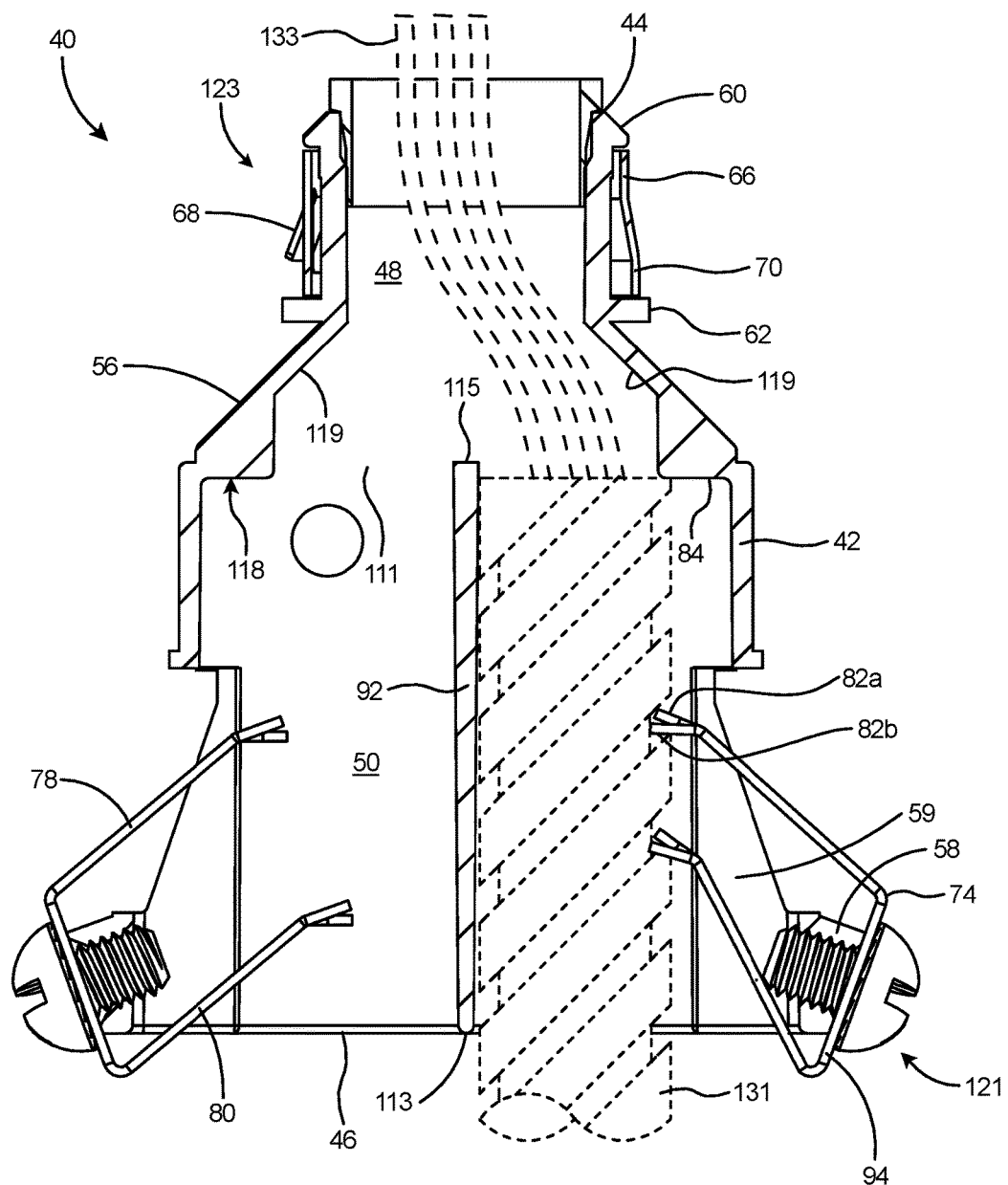
FIG. 14 is a sectional view of the duplex fitting of the present invention including an electrical cable inserted into one of the inlet bores of the fitting.

With reference to FIG. 14, there is shown a duplex fitting 40 with an electrical cable 131 inserted into one of the inlet bores 50 of the fitting. To operate the invention, one or more electrical cables may be pushed into a respective inlet bore 50 until the end of the cable 131 seats against abutment surface 118. Abutment surface 118 is preferably offset a distance D1 (see FIG. 9) from the leading end 115 of the dividing wall 92. As a cable 131 is inserted into one of the inlet bores 50, the conductors 133 continue into the outlet bore 48. Any conductors 133 that contact the funnel 119 on the interior surface of the collar 84 are redirected toward the axial center of the outlet bore 48 and thence out of the outlet bore, thereby easing advancement of conductors through the transition area 111.

The cable attachment arrangement 121 secures the electrical cable 131 tightly within the inlet bore 50. As the cable is inserted into the inlet bore 50, the feet 82a and 82b of the leading leg 78 and trailing leg 80 snap fit and lock into the grooves on the electrical cable 131. When leading end 44 of duplex fitting 40 is snapped into a knockout of a junction box (not shown), the box attachment arrangement 123 tightly secures the leading end 44 of the duplex fitting to the junction box. The resilient locking tangs 68 of the split snap ring 66 lock the fitting into the junction box and the grounding tangs 70 provide effective grounding of the fitting 40 and the cable 131 to the box.

Figure 15:
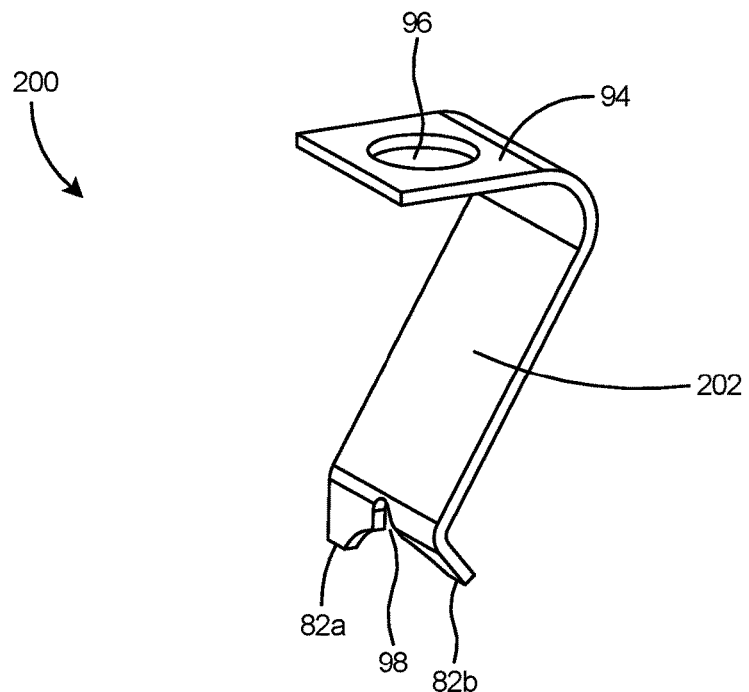
FIG. 15 is an isometric view of a second embodiment of a clip member according to the invention.
Figure 16:
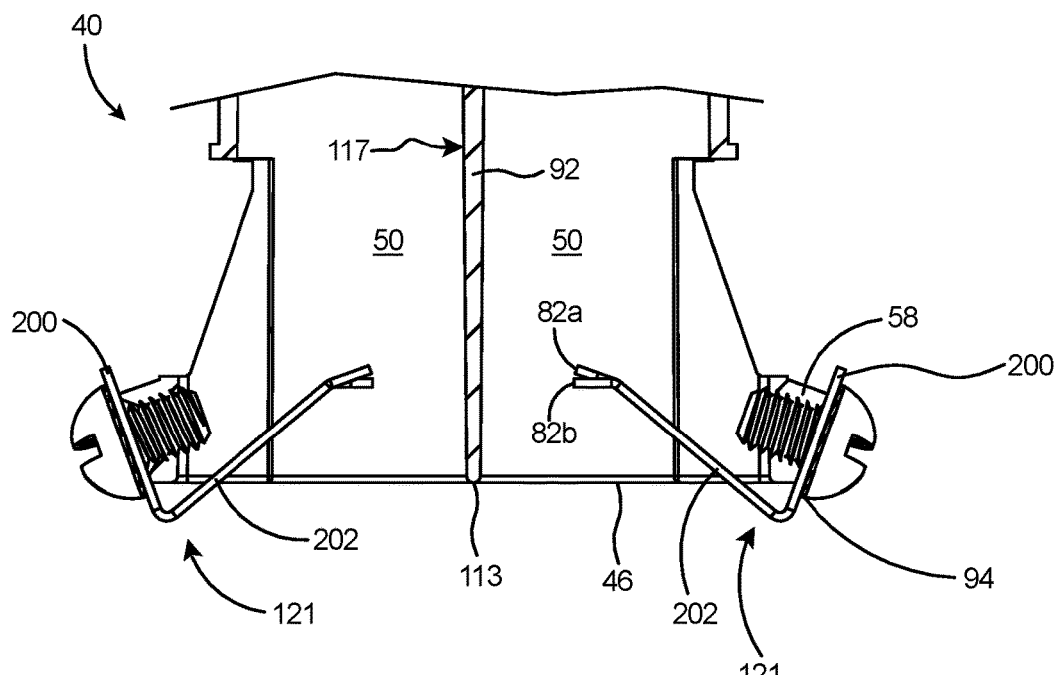
FIG. 16 is a sectional view of the inbound end portion of a second embodiment of the duplex fitting including a cable attachment arrangement including the clip member of FIG. 15.

With reference to FIG. 15, an alternate embodiment of the clip 200 includes a single leg 202 extending from the base 94. The leg 202 of clip 200 includes a first foot 82a and a second foot 82b defined by a notch 98 in the leg. As in the first embodiment, the base 94 preferably includes an aperture 96 therein. First foot 82a is preferably at a first angle from the plane containing the leg 202 and second foot 82b is preferably at a second, sharper angle from the plane containing the leg. As shown in FIG. 16, the alternate clip member 200 can be assembled with the connector body to form an alternate cable attachment means for the duplex electrical fitting. The resilient clips 200 secured at the wings 58 form a cable attachment arrangement 121 for securing an electrical cable within each inlet bore 50.

The connector body 42 of duplex electrical fitting 40 is preferably constructed in one piece of a conductive metal such as steel, zinc, galvanized steel, or aluminum. The connector body of the present invention is preferably formed by shaping of metal, by techniques such as die-casting, stamping from sheet metal, or by 3D machining. The connector body is most preferably formed by metal die-casting and die-casting alloys are the preferred material of construction. A most preferred material of construction for the connector body is ZAMAK™, a casting alloy comprised mainly of zinc alloyed with aluminum, magnesium, and copper and available from Eastern Alloys, Maybrook, N.Y. By constructing the tubular body of the preferred die-casting alloys, the electrical fittings disclosed herein will be electrically conductive and provide good electrical continuity or ground throughout the fitting and between the duplex fitting, the electrical box, and the electrical cables secured thereto.

The cable clip 74 is preferably constructed of spring steel and is electrically conductive. Constructing the connector body of zinc alloy and the cable clip of spring steel enables the electrical fitting to establish excellent electrical continuity between the metallic-sheathed cable, and the panel or electrical box it is connected to.

Although the description above contains many specific descriptions, materials, and dimensions, these should not be construed as limiting the scope of the invention but as merely providing illustrations of some of the embodiments of this invention. Thus the scope of the invention should be determined by the appended claims and their legal equivalents, rather than by the examples given.

What is claimed is:

1. A duplex electrical fitting for connecting electrical cable to an electrical box or panel comprising:
    a one-piece connector body, said connector body including a trailing end and a leading end;
    two inlet bores in said trailing end of said connector body;
    an outlet bore in said leading end of said connector body;
    a transition area at the intersection of said inlet bores and said outbound bore;
    a collar in said transition area, said collar including a flat abutment surface for stopping advancement of the cable within the fitting;
    a funnel surface on said collar for guiding a conductor to the outbound bore of the connector body;
    a cable attachment arrangement on said trailing end for snap engagement of an electrical cable within one or more of said inlet bores;
    a box attachment arrangement on said leading end for snap engagement of said duplex electrical fitting to the electrical box or panel;
    a bridge at said trailing end of said connector body, a cable clip secured to said bridge;
    a dividing wall separating said inlet bores;
    said dividing wall including sides at its longitudinal center; and
    said sides of said dividing wall are linear and parallel
    two lens-shaped cable passages in the fitting, said lens-shaped cable passages provide a wide path for pass-through of conductors through the fitting; and
    said lens-shaped cable passages in cross-section through said transition area extend across the funnel surface to the dividing wall.

2. The duplex electrical fitting of claim 1 wherein said lens-shaped cable passages in the fitting include a lateral extent and a longitudinal extent and said lateral extent of said lens-shaped cable passages is greater than the longitudinal extent.

3. The duplex electrical fitting of claim 1 wherein said box attachment arrangement comprises:
    a seat on said leading end of said connector body;
    a split snap ring disposed on said seat; and
    one or more locking tangs extending from said snap ring.

4. The duplex electrical fitting of claim 1 comprising:
    a base portion and two legs on said cable clip; and
    two tabs extending from each of said legs.

* * * * *